United States Patent
Hiramatsu et al.

(10) Patent No.: US 6,912,405 B2
(45) Date of Patent: Jun. 28, 2005

(54) MOBILE STATION APPARATUS AND TRANSMISSION POWER CONTROL METHOD

(75) Inventors: Katsuhiko Hiramatsu, Yokosuka (JP); Takashi Kitade, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 558 days.

(21) Appl. No.: 09/979,721

(22) PCT Filed: Mar. 29, 2001

(86) PCT No.: PCT/JP01/02639

§ 371 (c)(1),
(2), (4) Date: Nov. 28, 2001

(87) PCT Pub. No.: WO01/76100

PCT Pub. Date: Oct. 11, 2001

(65) Prior Publication Data

US 2002/0160802 A1 Oct. 31, 2002

(51) Int. Cl.[7] ............................................. H04Q 7/20
(52) U.S. Cl. ........................................ 455/522; 455/69
(58) Field of Search ...................... 455/522, 69, 442, 455/436–9, 452.1, 452.2; 375/299; 370/331–4

(56) References Cited

U.S. PATENT DOCUMENTS

| | | |
|---|---|---|
| 5,887,245 A | 3/1999 | Lindroth et al. |
| 5,978,657 A | 11/1999 | Suzuki |
| 6,400,953 B1 * | 6/2002 | Furukawa .................. 455/442 |
| 6,636,747 B2 * | 10/2003 | Harada et al. ........... 455/552.1 |
| 2003/0186653 A1 * | 10/2003 | Mohebbi et al. ........ 455/522 X |

FOREIGN PATENT DOCUMENTS

| | | |
|---|---|---|
| JP | 09326753 | 12/1997 |
| JP | 10112683 | 4/1998 |
| JP | 11069416 | 3/1999 |
| JP | 11122654 | 4/1999 |
| WO | 9914869 | 3/1999 |

OTHER PUBLICATIONS

Supplementary European Search Report dated Sep. 27, 2002.

* cited by examiner

Primary Examiner—Nay Maung
Assistant Examiner—Philip J Sobutka
(74) Attorney, Agent, or Firm—Stevens, Davis, Miller & Mosher, LLP

(57) ABSTRACT

A propagation loss measuring section 207 appropriately changes a measuring method according to the reception type of system informed from a base station so as to measure propagation losses. A propagation loss comparator 209 compares the propagation loss between the respective cells. A transmission slot controller 210 controls a data assembling section 211 and spreader 213 in such a way to transmit a signal to a base station existing in a cell with a smaller propagation loss. A transmission power controller 208 controls a RF section 202 in such a way to transmit a signal with a transmission power value obtained by adding the propagation loss value at each cell to a target reception power value at each base station.

7 Claims, 4 Drawing Sheets

MOBILE STATION APPARATUS AND TRANSMISSION POWER CONTROL METHOD

TECHNICAL FIELD

The present invention relates to a mobile station apparatus and a transmission power control method, and particularly to a mobile station apparatus and a transmission power control apparatus, which are used in a radio communication system using TDD (Time Division Duplex) system.

BACKGROUND ART

In a mobile communication system using a cellular system, communication quality normally becomes worst in the vicinity of the boundary between cells. For this reason, in the case where the mobile station is positioned in the vicinity of the boundary between cells, signals received by a plurality of base stations are combined or the signal having the best quality is selected from among the signals received by a plurality of base stations. This makes it possible to restrain deterioration of communication quality of a reverse link (link directing from the mobile station to the base station).

The receiving method in which the signals received by the plurality of base stations are combined to restrain the deterioration of the reception quality is hereinafter referred to as combining-type reception. While, the receiving method in which the signal having the best reception quality is selected from among the signals received by the plurality of base stations to restrain the deterioration of the reception quality is referred to as selecting-type reception.

Moreover, in the CDMA mobile communication system, transmission power control is performed in order to solve the so-called near-far problem.

In the case where the mobile station performs the so-called open-loop type transmission power control in connection with transmission power control, the mobile station subtracts a power value of a received signal from a transmission power value informed from the base station in advance so as to measure a propagation loss between the base station and the mobile station. Then, the mobile station adds the value of propagation loss to a desired reception power value at the base station so as to determine a transmission power value.

However, the following problem exists in the case where the system that performs the combining-type reception and the system that performs selecting-type reception are mixed.

Namely, the system that performs the combining-type reception can increase reception power by an amount corresponding to a diversity gain as compared with the system that performs selecting-type reception. Accordingly, if the mobile station directly performs transmission power control of open-loop type, which is carried out in the system that performs selecting-type reception by the mobile station, in the system that performs the combining-type reception, the reception quality exceeds a desired quality greatly at the base station. This results in poor efficiency in view of the system capacity.

For this reason, it is desirable that the mobile station should change the transmission power control method appropriately according to the reception type of the system where the mobile station is currently positioned. However, such a method has not been disclosed so far.

DISCLOSURE OF INVENTION

It is an object of the present invention is to provide a mobile station apparatus and a transmission power control method that are cable of performing appropriate transmission power control according to each system even in a case where the system that performs the combining-type reception and the system that performs selecting-type reception are mixed.

In order to attain the above object, the present invention changes a propagation loss measuring method appropriately according to the reception type of system.

BEST MODE FOR CARRYING OUT THE INVENTION

The following will explain an embodiment of the present invention with reference to the drawings accompanying herewith.

Figure 1:
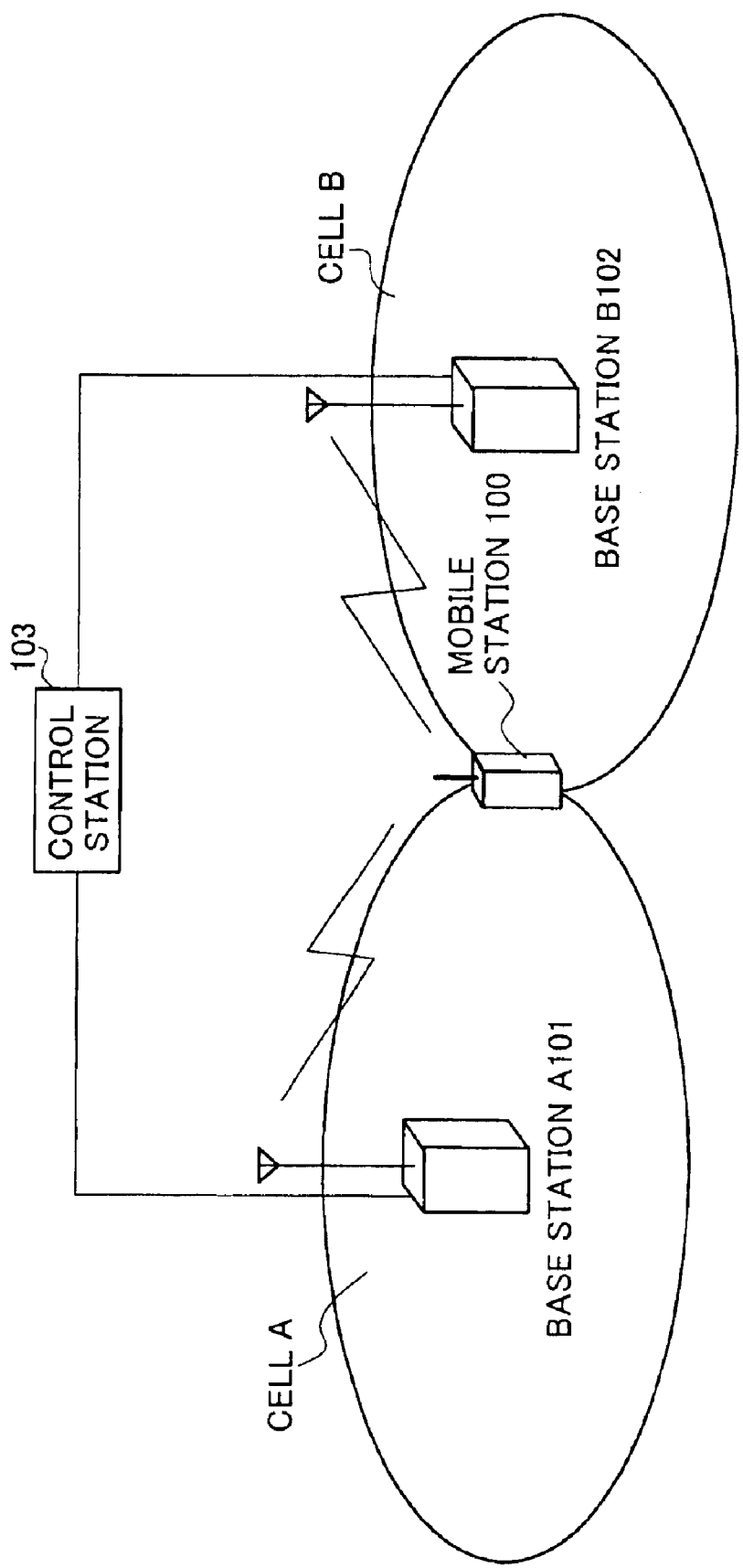
FIG. 1 is a configuration view of a radio communication system including a mobile station apparatus according to one embodiment of the present invention.

FIG. 1 is a configuration view of a radio communication system including a mobile station apparatus according to one embodiment of the present invention. This radio communication system is composed of a mobile station 100, a base station A101 that deals with cell A, a base station B102 that deals with cell B, and a control station 103.

The mobile station 100 performs communication with both base station A101 and base station B102 at the vicinity of the boundary between cell A and cell B. The base station A101 and base station B102 perform the combining-type reception or the selecting-type reception. Namely, in the case where the mobile station 100 is positioned at the vicinity of the boundary between cells, the control station 103 combines the signal received by the base station A101 with the signal received by the base station B102. Or, the control station 103 selects the signal having better quality from among the signal received by the base station A 101 and the signal received by the base station B102. Note that each system predetermines as to which of the combining-type reception and the selecting type reception is performed.

Figure 2:
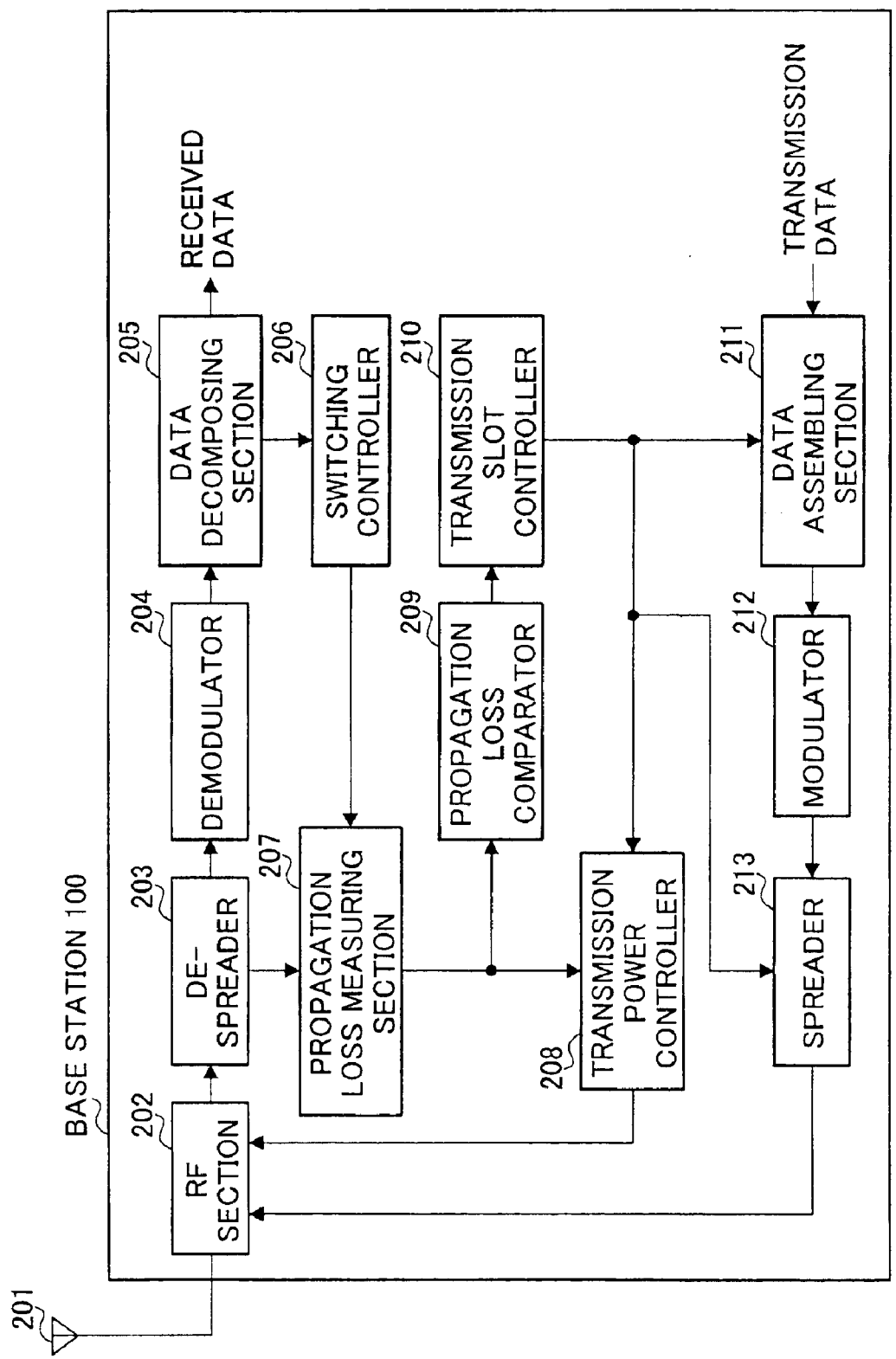
FIG. 2 is a general block diagram illustrating the configuration of the mobile station apparatus according to one embodiment of the present invention.

An explanation will be next given of the configuration of mobile station 100. FIG. 2 is a general block diagram illustrating the configuration of the mobile station apparatus according to one embodiment of the present invention.

In the mobile station 100, RF section 202 provides predetermined radio processing to a signal, which is transmitted/received via an antenna 201. A despreader 203 despreads a received signal. A demodulator 204 provides predetermined demodulation processing to a dedicated communication channel signal among the signals despread by the despreader 203. A data decomposing section 205 decomposes data, which is output from the demodulator 204 in frame unit, into slots. This obtains received data.

A switching controller 206 changes the propagation loss measuring method appropriately according to information (hereinafter referred to as reception type information) indicative of whether the system where the mobile station 100 is currently positioned performs the combining-type reception or the selecting-type reception. A propagation loss measuring section 207 changes the measuring method appropriately according to the reception type of system and measures the propagation loss under control of the switching controller 206. Note that the configuration of propagation loss measuring section 207 will be described later.

A transmission power controller 208 obtains a transmission power value from a propagation loss value and a given target reception power value at the base station A 101 and base station B102, and controls the power value of transmission signal. A propagation loss comparator 209 compares the propagation loss between the respective cells. A transmission slot controller 210 performs control as to which time slot is used to transmit data based on the comparison result.

A data assembling section 211 assembles the slots into a frame after storing transmission data to a predetermined slot according to control of the transmission slot controller 210. A modulator 212 provides predetermined modulation processing to transmission data. A spreader 213 provides spread processing to modulated data.

Figure 3:
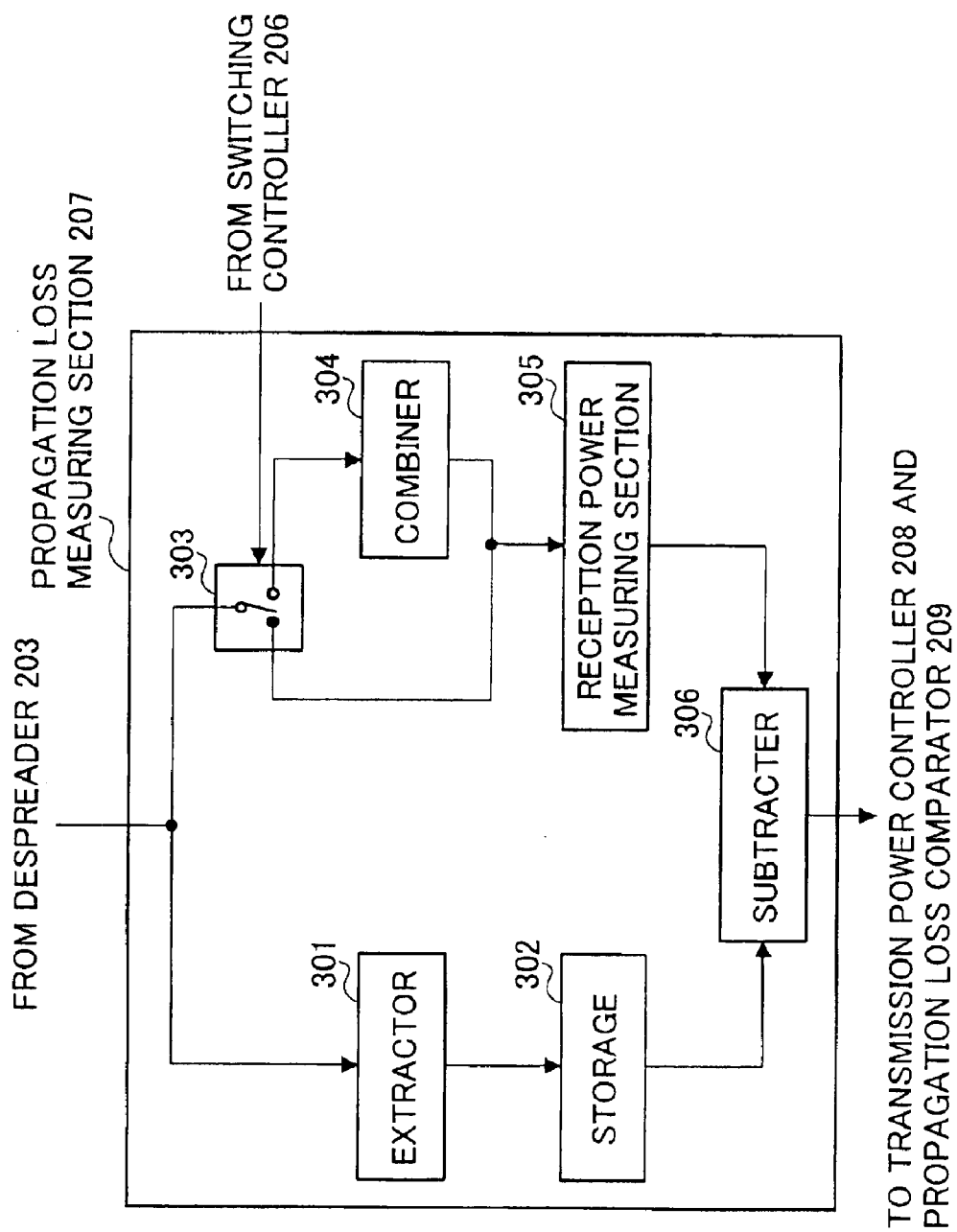
FIG. 3 is a general block diagram illustrating the configuration of a propagation loss measuring section of the mobile station apparatus according to one embodiment of the present invention.

An explanation will be next give of the configuration of the propagation loss measuring section 207. FIG. 3 is a general block diagram illustrating the configuration of the propagation loss measuring section of the mobile station apparatus according to one embodiment of the present invention In the propagation loss measuring section 207, an extractor 301 extracts information, indicative of a transmission power value of a common control channel signal, from a common control channel signal. The base station A101 and base station B102 can inform the mobile station 100 of the transmission power value of the common control channel signal using, for example, an broad cast channel signal among common control channel signals. Storage 302 stores the transmission power value of common control channel signal.

A switch 303 switches the connecting state according to the reception type under control of the switching controller 206. In the case where the system performs the combining-type reception, a combiner 304 combines the common control channel signal transmitted from the base station A101 with the common control channel signal transmitted from the base station B102 by a predetermined method. Note that any combining method may be possible if the method is the same as the combining method which is used with respect to the dedicated communication channel signal of the reverse link.

A reception power measuring section 305 measures the reception power of common control channel signal. A subtracter 306 subtracts the reception power value of the common control channel signal measured by the reception power measuring section 305 from the transmission power value of the common control channel signal stored in storage 302, whereby measuring propagation loss of each cell.

An explanation will be next given of the operation of the mobile station apparatus having the aforementioned structure.

Figures 4A, 4B:
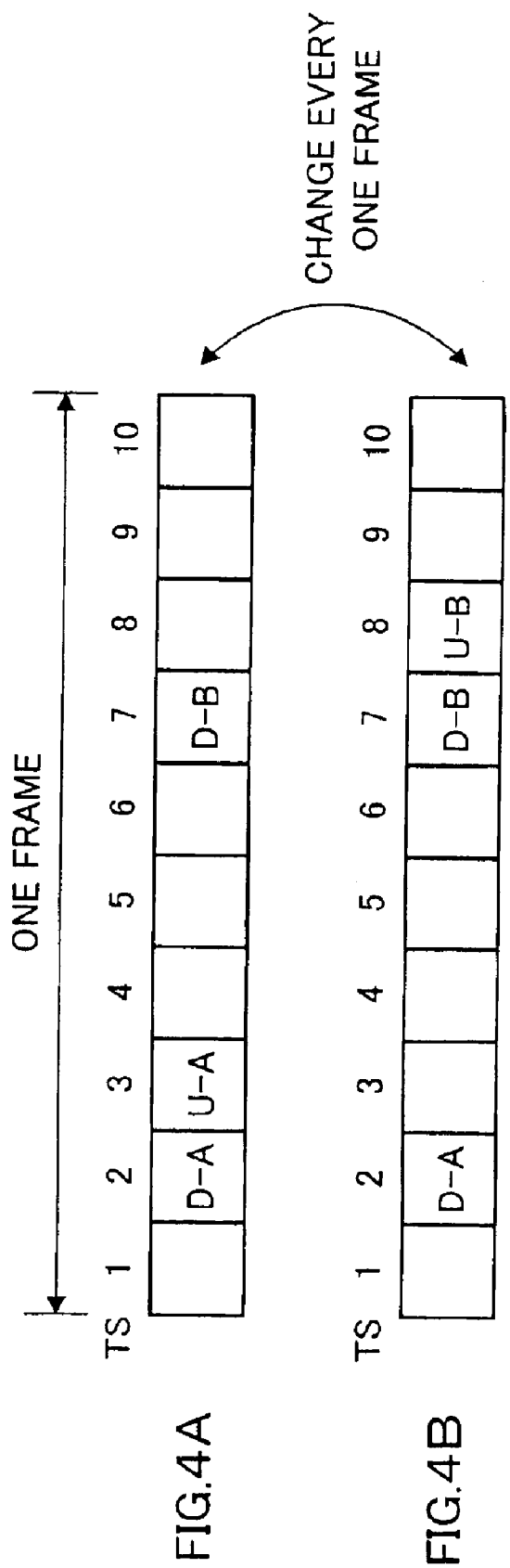
FIG. 4A is a schematic view illustrating one example of a time slot allocation state in order to explain the operation of the mobile station apparatus according to one embodiment of the present invention.
FIG. 4B is a schematic view illustrating one example of a time slot allocation state in order to explain the operation of the mobile station apparatus according to one embodiment of the present invention.

FIGS. 4A and 4B are schematic views each illustrating one example of a time slot allocation state in order to explain the operation of the mobile station apparatus according to one embodiment of the present invention. As illustrated in FIGS. 4A and 4B, the mobile station 100, base station A101, and base station B102 perform radio communications by TDD system.

In the explanation set forth below, it is assumed that time slot is TS, common control channel corresponding to cell A is D-A, common control channel corresponding to cell B is D-B, dedicated communication channel of reverse link corresponding to cell A is U-A and dedicated communication channel of reverse link corresponding to cell B is U-B. Moreover, it is assumed that signals to be transmitted using D-A, D-B, U-A, U-B are D-A signal, D-B signal, U-A signal and U-B signal, respectively. Still moreover, in the explanation set forth below, it is assumed that the mobile station 100 is currently positioned at the vicinity of the boundary between the cell A and cell B as illustrated in FIG. 1. Moreover, it is assumed that the mobile station 100 transmits the U-A signal currently.

The signal received via the antenna 201 is subjected to predetermined radio processing by the RF section 202, and then the resultant signal is subjected to despread processing by the despreader 203.

More specifically, in the allocation state shown in FIG. 4A, the despreader 203 provides despread processing to TS2 and TS7 using a spread code allocated every cell. This extracts the D-A signal (namely, common control channel signal transmitted from the base station A101) and the D-B signal (namely, common control channel signal transmitted from the base station B102) from the received signal. The extracted D-A signal and D-B signal are output to the propagation loss measuring section 207. The spread code allocated every cell corresponds to the spread code, which is used by the base station A101 and base station B102 at the time of spreading the common control channel signal.

Still moreover, the despreader 203 provides despread processing to the time slot in which the dedicated communication channel signal of forward link is transmitted by use of the spread code allocated to the mobile station 100. This extracts the dedicated communication channel signal respectively transmitted from the base station A101 and base station B101 from the received signal. The dedicated communication channel signal includes reception type information informed from the base station A101 and base station B102. The extracted dedicated communication channel signal is output to the demodulator 204.

The demodulator 304 demodulates the dedicated communication channel signal transmitted from the base station A101 and the dedicated communication channel signal transmitted from the base station B101 so as to combine these signals. This obtains data formed in the frame unit. Data formed in the frame unit is output to the data decomposing section 205.

The decomposing section 205 decomposes data formed in the frame unit into data formed in the slot unit. This obtains received data. The decomposed data is output to the switching controller 206.

Reception type information is obtained from data by the switching controller 206. After that, the switch control of a switch 303 is performed by the switching controller 206 according to this reception type information.

More specifically, in the case where the system uses the combining-type reception, the switching controller 206 connects the switch 303 to ○ mark side. This inputs the D-A signal and the D-B signal output from the despreader 203 into the combiner 304. The combiner 304 combines the D-A signal and the D-B signal by a predetermined method. The combined common control channel signal is output to the reception power measuring section 305.

While, in the case where the system uses the selecting-type reception, the switching controller 206 connects the switch 303 to ● mark side. This inputs the D-A signal and the D-B signal output from the despreader 203 into the reception power measuring section 305 directly.

The reception power measuring section 305 measures the reception power of common control channel signal. Namely, in the case where the system uses the combining-type reception, the reception power of the signal where the D-A signal and the D-B signal are combined is measured. While, in the case where the system uses the selecting-type reception, the reception power of the D-A signal and that of the D-B signal are respectively measured. Each measured or combined reception power value is output to the subtracter 306.

The extractor 301 extracts information indicative of the transmission power value of the D-A signal from the D-A signal and information indicative of the transmission value of the D-B signal from the D-B signal, respectively. The extracted transmission power value of the D-A signal and that of the D-B signal are stored in storage 302, respectively. Since the D-A signal and the D-B signal are transmitted in all frames as illustrated in FIGS. 4A and 4B, the transmission power values stored in storage 302 are updated on a frame-by-frame basis.

The subtracter 306 subtracts the reception power value output from the reception power measuring section 305 from the transmission power value stored in the storage 302, whereby measuring the propagation loss at each of cell A and cell B.

Namely, in the case where the system uses the combining-type reception, the subtracter 306 subtracts the reception power value in which the D-A signal and the D-B signal are combined from the transmission power value of the D-A signal so as to measure the propagation loss at cell A. Also, the subtracter 306 subtracts the reception power value in which the D-A signal and the D-B signal are combined from the transmission power value of the D-B signal so as to measure the propagation loss at cell B.

While, in the case where the system uses the selecting-type reception, the subtracter 306 subtracts the reception power value of the D-A signal from the transmission power value of the D-A signal so as to measure the propagation loss at cell A. Also, the subtracter 306 subtracts the reception power value of the D-B signal from the transmission power value of the D-B signal so as to measure the propagation loss at cell B.

Thus, the mobile station 100 changes the measuring method appropriately according to the reception type of the system where the mobile station 100 is currently positioned and measures propagation loss at each of cell A and cell B. The measured propagation loss values are output to the transmission power controller 208 and transmission loss comparator 209, respectively.

The transmission power controller 208 obtains the transmission power of the dedicated communication channel signal of the reverse link as follows:

Namely, the transmission power controller 208 adds the propagation loss value at the cell A to a predetermined target reception power value at the base station A101 so as to obtain the transmission power value of the U-A signal. Moreover, the transmission power controller 208 adds the propagation loss value at the cell B to a predetermined target reception power value at the base station B102 so as to obtain the transmission power value of the U-B signal. Additionally, the transmission power controller 208 may obtain the transmission power value with consideration given to an amount of gain adjustment.

The transmission loss comparator 209 compares the propagation loss at the cell A with the propagation loss at the cell B, and selects the cell with a smaller propagation loss. Then, a signal indicative of the selection result is output to the transmission slot controller 210.

As mentioned above, the mobile station 100, base station A101, and base station B102 perform radio communications by TDD system. In the TDD system, there is an extremely high correlation between the propagation path characteristic of the forward link and that of the reverse link. The correlation between the state of the propagation path of cell A at the time when the D-A signal is transmitted and the state of the propagation path of cell A at the time when the U-A signal is transmitted becomes higher. Also, the correlation between the state of the propagation path of cell B at the time when the D-B signal is transmitted and the state of the propagation path of cell B at the time when the U-B signal is transmitted becomes higher.

Here, the transmission slot controller 210 determines the channel and the time slot used in transmitting the dedicated communication channel signal based on the selection result at the propagation loss comparator 209 as follows:

Namely, in the allocation state illustrated in FIG. 4A, when the cell A is selected by the propagation loss comparator 209, the transmission slot controller 210 determines that data is transmitted in a next frame using U-A. Accordingly, in this case, the time slot allocation state is the same as in the state illustrated in FIG. 4A even in the next frame, and the U-A signal is transmitted from the mobile station 100.

While, when the cell B is selected by the propagation loss comparator 209 in the allocation state illustrated in FIG. 4A, the transmission slot controller 210 determines that data is transmitted in a next frame using U-B. Accordingly, in this case, the time slot allocation state is changed from the state shown in FIG. 4A to the state shown in FIG. 4B in the next frame, and the U-B signal is transmitted from the mobile station 100.

Thus, the transmission slot controller 210 determines the channel and the time slot used in transmitting the dedicated communication channel signal based on the selection result at the propagation loss comparator 209. This makes it possible for the mobile station 100 to respond to instantaneous variations of the propagation path state and always transmit the signal through the propagation path with the best condition. In other words, the mobile station 100 can always transmit the signal to the base station corresponding to the cell whose propagation path state is the best.

After that, the transmission slot controller 210 generates information (hereinafter referred to as channel information), which indicates by which dedicated communication channel data is transmitted, and information (hereinafter referred to as slot information), which indicates by which time slot data is transmitted. Then, generated information is output to the transmission power controller 208, data assembling section 211, and spreader 213.

The data assembling section 211 stores transmission data into a predetermined slot according to slot information, and puts a plurality slots together to assemble a frame. More specifically, in the case when the U-A signal is transmitted, the data assembling section 211 stores transmission data into ST3 as illustrated in FIG. 4A. While, in the case where the U-B signal is transmitted, the data assembling section 211 stores transmission data into ST8 as illustrated in FIG. 4B.

Framed data is output to the modulator 212 by which predetermined modulation processing is provided thereto. Data subjected to modulation processing is output to the spreader 213.

The spreader 213 provides spread processing to modulated data according to channel information and slot information. More specifically, in the where the U-A signal is transmitted, the spreader 213 provides spread processing to data stored in TS3 using the spread code allocated to the cell A at timing when TS3 is inputted. While, in the where the U-B signal is transmitted, the spreader 213 provides spread processing to data stored in TS8 using the spread code allocated to the cell B at timing when TS8 is inputted. Data subjected to spread processing is output to the RF section 202.

Moreover, at this time, the transmission power controller 208 controls the transmission power of the dedicated communication channel signal based on slot information. More specifically, in the case where the U-A signal is transmitted, the transmission power controller 208 controls the RF section 202 such that the transmission power of TS3 reaches the transmission power value of the U-A signal obtained as mentioned above. While, in the case where the U-B signal is transmitted, the transmission power controller 208 controls the RF section 202 such that the transmission power of TS8 reaches the transmission power value of the U-B signal obtained as mentioned above.

Under this control, the U-A signal or the U-B signal is amplified to the aforementioned transmission power by the RF section 202, and the amplified signal is subjected to predetermined radio processing and transmitted via the antenna 201.

The dedicated communication channel signal transmitted from the mobile station 100 is received by the base station A101 and base station B102. As mentioned above, whether the U-A signal or the U-B signal is transmitted is determined by the mobile station 100, the base station A101 and base station b102 cannot judge in which slot the dedicated communication channel signal is transmitted. For this reason, in the system illustrated in FIG. 1, both the base station A101 and base station B102 receives the U-A signal or the U-B signal.

The base station A101 and base station B102 provide demodulation processing to the dedicated communication channel signal, and output the resultant signal to the control station 103.

In the case where the system uses the combining-type reception, the control station 103 combines the dedicated communication channel signal output from the base station A101 with the dedicated communication channel signal output from the base station B102 by a predetermined method. While, in the case where the system uses the selecting-type reception, the control station 103 selects the dedicated communication channel signal having better reception quality from among the dedicated communication channel signal output from the base station A101 and the dedicated communication channel output from the base station B102.

Thus, according to the present embodiment, the mobile station appropriately changes the measuring method according to the reception type of the system where the mobile station is currently positioned so as to measure the propagation loss. For this reason, according to the present embodiment, in the case where the system performs the combining-type reception, the propagation loss is measured with consideration given to a diversity gain, making it possible to reduce the transmission power by the diversity gain amount. Therefore, according to the present embodiment, even if the system performs the combining-type reception, it is possible to prevent the quality of combined signal from exceeding the desired quality greatly.

Moreover, according to the present embodiment, the propagation path with the minimum propagation loss is selected and the dedicated communication channel signal is transmitted therethrough. For this reason, the number of time slots used to transmit the dedicated communication channel signals of reverse link may be always only one in each frame. Accordingly, the present embodiment makes it possible to reduce interference with other communication and decrease power consumption of the mobile station apparatus as compared with the case in which the transmission of dedicated communication channel signal is performed using the plurality of slots in the vicinity of the boundary between cells.

Still moreover, according to the present embodiment, the time slot allocation state is appropriately changed such that the transmission of dedicated communication channel signal is performed through the propagation path with the minimum propagation loss in the vicinity of the boundary between cells. Accordingly, the present embodiment makes it possible to reduce possibility that the communication channel will be interrupted in the vicinity of the boundary between cells as compared with the conventional case in which hard handover is performed.

Still moreover, the transmission of dedicated communication channel signal is carried out through the propagation path with the minimum propagation loss, making it possible for the mobile station to respond to instantaneous variations of the propagation path state and always transmit the signal through the propagation path with the best condition.

In the present embodiment, the change of time slot allocation state is performed for each frame. However, the change unit of time allocation state is not limited to the above. For example, in the present embodiment, the change of time slot allocation state may be performed each of the block unit of error correction.

Moreover, the present embodiment explained the case using CDMA as a signal multiplexing method at each time slot. However, the multiplexing method is not limited to the above. For example, the present embodiment can use OFDM (Orthogonal Frequency Division Multiplexing) as a signal multiplexing method at each time slot.

Still moreover, the present embodiment explained the case in which the mobile station is positioned in the vicinity of the boundary between two cells for convenience of explanation. However, the present embodiment is applicable to the case in which the mobile station is positioned in the vicinity of the boundary among three or more cells without being limited to this case.

Still moreover, the present embodiment explained the case in which the mobile station is positioned in the vicinity of the boundary between cells. However, the present embodiment is not limited to this, and is applicable to the case in which the mobile station is positioned in the vicinity of the boundary between sectors. In the case where the mobile station is positioned in the vicinity of the boundary between sectors, the mobile station measures the propagation loss at each of the plurality of sectors, and transmits the dedicated communication channel signal to the antenna corresponding to the sector with the minimum propagation loss.

Still moreover, the present embodiment explained the case in which the common control channel signal is used as a signal to measure the propagation loss. However, the present embodiment is not limited to this. Any signal may be used to measure the propagation loss if the signal is transmitted to all mobile stations from the base station with fixed power.

Furthermore, in the present embodiment, it is possible to measure the propagation loss using the signal transmitted to each mobile station from each base station with different power. For example, there is a case in which the base station performs transmission power control with respect to the dedicated communication channel signal of forward link. In this case, the transmission power values of the dedicated communication channel signals transmitted to the respective mobile stations are different from each other, so that each mobile station cannot simply measure the propagation loss from the reception level of dedicated communication channel signal. However, even in this case, the mobile station can measure the propagation loss of the dedicated communication channel signal for each base station if the mobile station can estimate the transmission power value of the dedicated communication channel signal transmitted from each base station by the method using, a command for, e.g., closed loop transmission power control. Thus, the mobile station can measure the propagation loss using the dedicated communication channel signal transmitted from each base station.

As explained above, according to the present invention, the propagation loss measuring method can be appropriately changed according to the reception type of system, so that suitable transmission power control can be carried out according to each system even in a case where the system that performs the combining-type reception and the system that performs selecting-type reception are mixed.

This application is based on the Japanese Patent Application No. 2000-093901 filed on Mar. 30, 2000, entire content of which is expressly incorporated by reference herein.

INDUSTRIAL APPLICABILITY

The present invention can be applied to the radio communication apparatuses such as a mobile station apparatus and a base station apparatus used in a TDD radio communication system.

What is claimed is:

1. A mobile station apparatus comprising:
   a measurer that measures individual propagation losses of a plurality of propagation paths while changing a method of measurement according to a type of reception employed in a base station apparatus, said type of reception being one of combining-type reception and selecting-type reception;
   a controller that determines a transmission power based on a measured propagation loss; and
   a transmitter that transmits a signal with the transmission power, through a propagation path of minimum propagation loss among the plurality of propagation paths.

2. The mobile station apparatus according to claim 1, wherein said measurer changes the method of measurement with reference to reception type information reported from the base station apparatus.

3. The mobile station apparatus according to claim 1, wherein:
   said measurer measures propagation losses of propagation paths from a plurality of cells, and
   said transmitter transmits the signal to the base station apparatus that corresponds to a cell of minimum propagation loss among the plurality of cells.

4. The mobile station apparatus according to claim 1, wherein:
   said measurer measures propagation losses of propagation paths from a plurality of sectors, and
   said transmitter transmits the signal to an antenna that corresponds to a sector of minimum propagation loss among the plurality of sectors.

5. The mobile station apparatus according to claim 1, wherein said measurer comprises:
   a reception power measurer that measures reception power of:
      a signal in which signals received through the plurality of propagation paths are combined, when the base station apparatus employs the combining-type reception, and
      each of the signals received through the plurality of propagation paths, when the base station apparatus employs the selecting-type reception; and
   a propagation loss measurer that measures the propagation loss of each propagation path based on the measured reception power and a transmission power used by the base station apparatus to transmit the signal through the propagation path.

6. A mobile communication system comprising a base station apparatus and a mobile station apparatus, wherein:
   said base station apparatus reports a type of reception employed in said base station apparatus to said mobile station apparatus, said type of reception being one of combining-type reception and selecting-type reception; and
   said mobile station apparatus:
      measures propagation losses of a plurality of propagation paths while changing a method of measurement according to the type of reception reported from said base station apparatus;
      determines a transmission power based on a measured propagation loss; and
      transmits a signal with the transmission power, through a propagation path of minimum propagation loss among the plurality of propagation paths.

7. A transmission power control method comprising:
   measuring individual propagation losses of a plurality of propagation paths while changing a method of measurement according to a type of reception employed in a base station apparatus, said type of reception being one of combining-type reception and selecting-type reception; and
   transmitting a signal with a transmission power determined based on a measured propagation loss, through a propagation path of minimum propagation loss among the plurality of propagation paths.

* * * * *